3,661,792
INCREASING THE PARTICLE SIZE OF PRECIPITATED HALOPHOSPHATE PHOSPHORS WITH THE AID OF SEED MATERIAL
Hugh C. Bertsch and Michael E. Russo, St. Louis, Mo., assignors to Mallinckrodt Chemical Works, St. Louis, Mo.
No Drawing. Filed June 5, 1970, Ser. No. 43,972
Int. Cl. C01b *25/32;* C09k *1/36*
U.S. Cl. 252—301.4 P                                   7 Claims

ABSTRACT OF THE DISCLOSURE

The particle size of precipitated alkaline earth haloapatites is increased by carrying out the precipitation in the presence of a suitable seed material. The seed material is preferably a precipitated alkaline earth haloapatite substantially all of whose particles are of a size between about 1 and 4 microns. Before use, the seed material is dried at a temperature not exceeding its softening point, conveniently about 125° C. Precipitation at a temperature above about 50° C. in the presence of such a seed material yields a granular precipitate whose particles are of a size substantially within the preferred 3 to 30 micron range.

BACKGROUND OF THE INVENTION

This invention relates to the field of luminescent phosphors, and more particularly to a process for increasing the particle size of precipitated halophosphate phosphors.

Various activated alkaline earth halophosphates are well known and widely used as phosphors in the manufacture of fluorescent lamps. It has long been recognized that the particle size of these phosphors is of prime importance in determining the brightness and longevity of the finished lamp.

Essentially all commercial production of alkaline earth halophosphate phosphors has heretofore been carried out using ceramic solid state reaction and diffusion processes. Solid state processes, however, are cumbersome, time-consuming, and costly. For a number of years, the art has devoted efforts to developing alternative processes which avoid the disadvantages of ceramic processes.

Among the alternative processes which have been studied are various precipitation methods. Methods for preparing alkaline earth haloapatites are known, for example, which involve precipitation from solutions containing the essential chemical components of the halophosphate. One particularly convenient method of preparing halophosphates involves the concurrent addition of a plurality of reactant solutions, the summation of which contain the constituent ions of the halophosphate, to a precipitation medium. It is difficult, however, to obtain a precipitated product having the desired 3 to 30 micron particle size range by this method. Thus, prior to the present invention, there has been no process known to the art whereby alkaline earth halophosphates of the desired 3 to 30 micron particle size could be consistently prepared by simple simultaneous addition of reactant solutions to a precipitation medium.

Further, to fully develop the luminescent properties of a precipitated alkaline earth halophosphate, the dried precipitate is normally thermally refined by heating it to a temperature of about 1050° C. to 1200° C. for a brief period, e.g., 15 minutes. Control of particle size before and after thermal refining is, however, difficult. Moreover, milling the ignited phosphor is known to have serious detrimental effects.

SUMMARY OF THE INVENTION

Among the several objects of the present invention, therefore, may be mentioned the provision of an improved process for the preparation of precipitated haloapatite phosphors; the provision of a process for increasing the particle size of a haloapatite phosphor precipitated by the addition, including the simultaneous addition, of reactant solutions to a precipitation medium; and the provision of a process for increasing the particle size of a precipitated haloapatite phosphor so that the precipitated particles lie substantially within the desired 3 to 30 micron particle size range. Other objects and features will be in part apparent and in part pointed out hereinafter.

The present invention is thus directed to a process for preparing alkaline earth haloapatites which comprises mixing at least two aqueous reactant solutions, the summation of which contain phosphate, fluoride and bivalent alkaline earth ions known to be useful in forming the matrix of a haloapatite phosphor, at a temperature of at least about 50° C. in the presence of a precipitated particulate alkaline earth halophosphate seed material having approximately the same chemical composition and crystalline configuration as the desired phosphor. There is thereby precipitated a haloapatite phosphor consisting of particles of a size substantially within the range of 3 to 30 microns. The present invention is further directed to such a process wherein the particles of precipitated seed material are not larger than about 4 microns. The invention is also directed to such a process in which the stated seed material is initially prepared by mixing at least two reactant solutions, the summation of which contain phosphate, fluoride and bivalent alkaline earth ions known to be useful in forming the matrix of a haloapatite phosphor, and thereafter drying the resulting precipitate.

DESCRIPTION OF THE PREFERRED EMBODIMENTS

In accordance with the present invention, the average size of precipitated alkaline earth halophosphate phosphors is increased well beyond the size which prior precipitation methods normally provided. The precipitated particles produced are substantially within the preferred range of 3 to 30 microns. Such relatively coarse granules of a haloapatite phosphor are conveniently prepared by precipitation in the presence of certain seed materials. We have found that effective seed materials may be prepared by precipitating an alkaline earth haloapatite of the same general composition as the desired phosphor, and then drying the precipitate.

The method of the present invention is particularly useful in conjunction with the methods disclosed in the co-assigned application of D. J. Frese et al., Ser. No. 610,772, filed Jan. 23, 1967 (now abandoned) and the copending and coassigned applications of H. C. Bertsch, Ser. No. 736,279, filed June 12, 1968, now U.S. Pat. 3,575,877, dated Apr. 20, 1971 and Roger D. Piper, Ser. No. 7,408, filed Feb. 6, 1970, now U.S. Pat. No. 3,575,876, dated Apr. 20, 1971.

It is important that the material used as seed in the practice of the invention be precipitated and dried as described hereinafter so that a dry active seed is provided whose particle size is preferably not substantially greater than about 4 microns. We have found that certain other materials having the same chemical composition as the seed material disclosed herein, but which were not prepared in accordance with our method, do not serve effectively in promoting the precipitation of a phosphor whose constituent particles exhibit the desired 3 to 30 micron size. Thus, although a dried precipitated seed promotes the formation of phosphors of the desired particle size, a precipitated seed which has not been dried is surprisingly ineffective in so doing. Similarly, a precipitated seed which has been dried and thermally refined is also ineffective.

The size of the seed material is also important. Though seeding can be effected through use of particles of a wide range of sizes, phosphor particle size is most readily controlled within the desired 3 to 30 micron range by use of seed material whose particles are not substantially larger than about 4 microns, and preferably in the range of about 1 to 2 microns. While a fine granular seed whose particles are larger than 1 micron is preferred for handling reasons, it should be understood that particles smaller than 1 micron, which tend to form as a semi-colloidal suspension, are fully effective seed materials once they have been separated from their own mother liquor and dried. Fine granular haloapatite precipitates are readily prepared by simultaneously adding at least two solutions respectively containing the required cations and anions to a precipitation medium at a temperature above about 50° C., preferably about 60° C. A semi-colloidal precipitate tends to form if lower seed precipitation temperatures are used. Alternatively, a solution containing the required cations may be gradually added with stirring to a solution containing the required anions. After precipitation, the seed material is normally separated from its mother liquor, as by filtration, and washed.

As noted above, the precipitated seed material should be dried in order to be active in promoting the growth of larger particles. The drying temperature is not critical provided it is below the temperature at which substantive changes in the crystal structure of the material begin to occur. Thus, if the material is subjected to the thermal refining temperatures required to fully activate the luminescent properties of the phosphor, i.e., at about 1050° C. to 1200° C., it loses its activity as a seed material. The reason for this is not fully understood. Since heating the precipitate at a high temperature is of no benefit for the purposes of the present invention and is therefore best avoided. 125° C. is an adequate and preferred drying temperature. It will be understood, however, that temperatures above 125° C., though unnecessary, can be used. Even temperatures below 100° C. can be utilized, but drying at low temperatures is undesirably slow. After drying, the seed material may be passed through a fine screen to break up any soft lumps or agglomerates.

In use, the seed material is suspended in an aqueous precipitation medium and the phosphor precipitation is then carried out in the customary manner. In the preferred embodiment of this invention, two reactant solutions, one containing fluoride and phosphate anions, the other containing bivalent alkaline earth ions and ions of an activator element, such as antimony or manganese, are added simultaneously to an aqueous precipitation medium in which the seed material is suspended. The precipitating medium desirably contains at least about 0.3 gram of seed material per 100 ml. of the total volume of the reactant solutions, for example, for reactant solutions of the type described in the examples hereinafter, and more preferably about 0.6 gram per 100 ml. Greater amounts of seed material can be used, but are not required. The temperature of the precipitation medium should be above about 50° C.

Temperatures lower than about 50° C. tend to favor the formation of a semicolloidal, rather gelatinous precipitate instead of the desired granular form, even in the presence of seed material. The preferred precipitation tempertaure is about 60° C. A granular precipitate is readily obtained at temperatures well above 60° C., but such temperatures favor the formation of tri-calcium phosphate which is not an active phosphor.

The following examples illustrate the invention:

EXAMPLE 1

The following solutions were first prepared.

Anion solution:
   $(NH_4)_2HPO_4$—143.2 g.
   $NH_4F$—11.2 g.
   $NH_4OH$ (58% soln.)—100 ml.
   Water—To make 1500 ml.
Cation solution:
   $CaCl_2$—188 g.
   HCl (38% soln.)—11 ml.
   $SrCO_3$—2.67 g.
   $CdCO_3$—3.12 g.
   $MnCl_2$—5.68 g.
   $Sb_2O_3$ (dissolved in 13.8 ml. concentrated HCl)—2.97
   Water to make 1000 ml.

These solutions were simultaneously added with stirring to 500 ml. of water heated to 60° C. at the rates indicated in the following table.

| Time, minutes | Ml. cation solution added | Ml. anion solution added | Temperature, ° C. |
|---|---|---|---|
| 0 | 0 | 0 | 60 |
| 20 | 250 | 375 | 63 |
| 40 | 490 | 750 | 62 |
| 53 | 750 | 1,120 | 62 |
| 62 | 1,000 | 1,500 | 61 |

After addition of the cation and anion solutions was complete, the reaction mixture was allowed to cool to room temperature. The pH was 7.9. The precipitated halophosphate material was filtered off, washed with 1000 ml. of distilled water and dried at 125° C. When examined under a microscope, the product was found to be in the form of small granular particles about 1–2$\mu$ in diameter.

EXAMPLE 2

The following solutions were first prepared:

Anion solution:
   $(NH_4)_2HPO_4$—143.2 g.
   $NH_4F$—11.2 g.
   $NH_4OH$ (58% soln.)—90 ml.
   Water—To make 1500 ml.
Cation solution:
   $CaCl_2$—188.8 g.
   HCl (38% soln.)—11 ml.
   $SrCO_3$—2.67 g.
   $CdCo_3$—3.12 g.
   $MnCl_2$—5.69 g.
   $Sb_2O_3$ (in 13.5 ml. conc'd HCl)—2.97 g.
   Water—to make 1000 ml.

These solutions were simultaneously added to a stirred suspension of 15.0 g. of the dried seed material of Example 1 in 600 ml. of water which had been heated to 60° C. The rates of addition of the cation and anion solutions were as indicated in the following table:

| Time, minutes | Ml. cation solution | Ml. anion solution | Temperature, ° C. |
|---|---|---|---|
| 0 | 0 | 0 | 60 |
| 18 | 250 | 375 | 60 |
| 32 | 500 | 750 | 61 |
| 48 | 750 | 1,110 | 61 |
| 62 | 1,000 | 1,500 | 62 |

After addition was completed the reaction was allowed to cool ot room temperature. The pH was 7.3. The precipitated halophosphate material was filtered off and washed. This precipitated material was examined prior to drying at 125° C. and found to consist of particles substantially within the range of 10–30 microns.

It will be noted that the Examples 1 and 2 are essentially the same, the difference being the presence of the seed material in Example 2. Thus, the presence of the seed material effected an increase in particle size from 1–2 microns to 10–30 microns.

EXAMPLE 3

Suitable seed material may also be prepared by dropwise addition of the cation solution to the anion solution. The composition of the solution was:

Anion solution:
$(NH_4)_2HPO_4$—143.2 g.
$NH_4F$—11.2 g.
$NH_4OH$ (58% soln.)—73 ml.
Water—To make 3000 ml.

Cation solution:
$CaCl_2$—172 g.
HCl (38% soln.)—24.5 g.
$Sb_2O_3$—2.25 g.
$SrCO_3$—6.23 g.
$Mn(NO_3)_2$—9.23 g.
Water to make 1000 ml.

The cation solution was added to the anion solution at the rate of approximately 9.7 ml. per minute. Both solutions were at room temperature. After the addition was complete the pH of the reaction mixture was 4.9. The precipitated halophosphate seed material was filtered off washed with 1000 ml. of water and dried at 125° C. The particle size of this material was chiefly in the range of 1 to 4 microns.

EXAMPLE 4

The cation and anion solutions had the following compositions:

Anion solution:
$(NH_4)_2HPO_4$—143.2 g.
$NH_4F$—27.8 g.
$NH_4OH$ (58% soln.)—90 ml.
Water to make 1500 ml.

Cation solution:
$CaCl_2$—189 g.
$Sb_2O_3$[1]—2.97 g.
HCl (38% soln.)—28.5 g.
$SrCO_3$—2.67 g.
$CdCO_3$—3.12 g.
$MnCl_2$—5.68 g.
Water to make 1000 ml.

[1] Dissolved first in 5 13. ml. of the HCl.

A suspension of 45.0 g. of the seed material from Example 3 was heated to 60° C. and to it were simultaneously added with stirring the cation and anion solutions at the rates indicated in the following table:

| Elapsed time in minutes | Total ml. cation solution added | Total ml. anion solution added | Temperature, °C. |
|---|---|---|---|
| 0 | 0 | 0 | 60 |
| 36 | 490 | 750 | 60–63 |
| 53 | 750 | 1,125 | 63 |
| 65 | 1,000 | 1,500 | 62 |

When the addition was complete the reaction mixture was allowed to cool to room temperature. The pH was then 7.4. The precipitated haloapatite produce was filtered off, washed with 1000 ml. of water and dried at 125° C. When examined under a microscope, the size of the particles was seen to be substantially within the range of 7–32 microns.

EXAMPLE 5

The following solutions were first prepared:

Cation solution:
$CaCl_2$—600.6 g.
HCl (38% soln.)—80 ml.
$Sb_2O_3$—7.20 g.
$SrCO_3$—9.97 g.
Water to make 4000 ml.
The pH was 0.10

Anion solution:
$(NH_4)_2HPO_4$—458.2 g.
$NH_4F$—35.8 g.
$NH_4OH$ (58% soln.)—320 ml.
Water to make 4000 ml.
The pH was 9.75

The solutions were simultaneously added over a period of 17 minutes to a vessel containing 2000 ml. of water at room temperature. Vigorous stirring was achieved using a standard motor-driven propeller-type stirrer. The final pH was 8.3. A semicolloidal suspension was formed from which a solid precipitate was recovered using a centrifuge, and the filter cake was dried in an oven at 125° C. The dried product was quite lumpy. Using a mortar and pestle, it was reduced to a powder that would pass through a 325 mesh screen.

EXAMPLE 6

The following solutions were first prepared:

Anion solution:
$(NH_4)_2HPO_4$—143.2 g.
$NH_4F$—11.2 g.
$NH_4OH$ (58% soln.)—90 ml.
Water to make 1500 ml.

Cation solution:
$CaCl_2$—188 g.
HCl (38% soln.)—11.2 ml.
$SrCO_3$—2.67 g.
$MnCl_2$—5.7 g.
$CdCO_3$—3.12 g.
Water to make 1000 ml.

These solutions were simultaneously added with stirring to a suspension of 45.0 g. of the seed material from Example 5 at the rates indicated in the following table.

| Time, minutes | Ml. cation solution | Ml. anion solution | Temperature, °C. |
|---|---|---|---|
| 0 | | | 60 |
| 27 | 250 | 450 | 57 |
| 40 | 375 | 625 | 55 |
| 57 | 500 | 750 | 63 |
| 82 | 740 | 1,125 | 61 |
| 100 | 1,000 | 1,500 | 61 |

The final pH was 7.45. The precipitated phosphor was filtered off, washed with 1000 ml. of water, and dried at 125° C. Under the microscope, the size of the particles fell substantially within the range of 5–20 microns.

In view of the above, it will be seen that the several objects of the invention are achieved and other advantageous results attained.

As various changes could be made in the above methods without departing from the scope of the invention, it is intended that all matter contained in the above description shall be interpreted as illustrative and not in a limiting sense.

What is claimed is:

1. In a process for preparing alkaline earth haloapatites by coprecipitation which comprises mixing at least two aqueous reactant solutions, the summation of which contain phosphate, fluoride and bivalent metal ions known to be useful in forming the matrix of a haloapatite phosphor, the improvement which comprises carrying out the precipitation at a temperature of at least about 50° C. in the presence of a dried precipitated particulate seed material having approximately the same chemical composition and crystalline configuration as the desired phosphor.

2. The process set forth in claim 1 wherein the particles of the precipitated seed material are not larger than about 4 microns.

3. The process set forth in claim 1 wherein the precipitation is carried out at a temperature of between about 50° C. and about 60° C.

4. The process set forth in claim 1 wherein the precipitation is carried out at a temperature of about 60° C.

5. The process set forth in claim 1 wherein the seed material is initially prepared by mixing at least two reactant solutions, the summation of which contain phosphate, fluoride, and bivalent alkaline earth ions known to be useful in forming the matrix of a haloapatite phosphor and thereafter drying the resulting precipitate.

6. The process set forth in claim 5 wherein the seed material is dried at a temperature of about 125° C.

7. The process set forth in claim 1 wherein at least one of the reactant solutions contains ions of at least one activator material.

References Cited
UNITED STATES PATENTS

| | | | |
|---|---|---|---|
| 2,962,616 | 11/1960 | Homer et al. | 252—301.4 R |
| 3,030,313 | 4/1962 | Alles | 252—301.4 R |
| 3,538,014 | 11/1970 | Wachtel | 252—301.4 P |

ROBERT D. EDMONDS, Primary Examiner

U.S. Cl. X.R.

23—109; 252—301.6 P